Oct. 30, 1928 W. J. RANCOURT Re. 17,122

TAP SPLITTING MACHINE

Original Filed May 7, 1923

Inventor:
Walter J. Rancourt.
by his attorney
Charles H. Gow.

Reissued Oct. 30, 1928. Re. 17,122

UNITED STATES PATENT OFFICE.

WALTER J. RANCOURT, OF BOSTON, MASSACHUSETTS.

TAP-SPLITTING MACHINE.

Original No. 1,514,100, dated November 4, 1924, Serial No. 637,192, filed May 7, 1923. Application for reissue filed July 26, 1928. Serial No. 295,588.

This invention relates to a machine for splitting a tap for boots and shoes a portion of its length from the rear end thereof.

Taps which are made of composition or rubber are in many instances split from the rear end thereof for a portion of their length in order that tape may be inserted therebetween to more firmly hold the tacks or nails by which the said taps are fastened to the sole of a boot or shoe.

The object of this invention, therefore, is to speedily and accurately split the taps of boots or shoes for a portion of their length from the rear end thereof. The invention consists in the combination and arrangements of parts set forth in the following specification and particularly pointed out in the claims thereof, whereby the object hereinbefore set forth may be attained.

Referring to the drawings.

Like numerals refer to like parts throughout the several views of the drawings.

Figures 1, 2, 3:
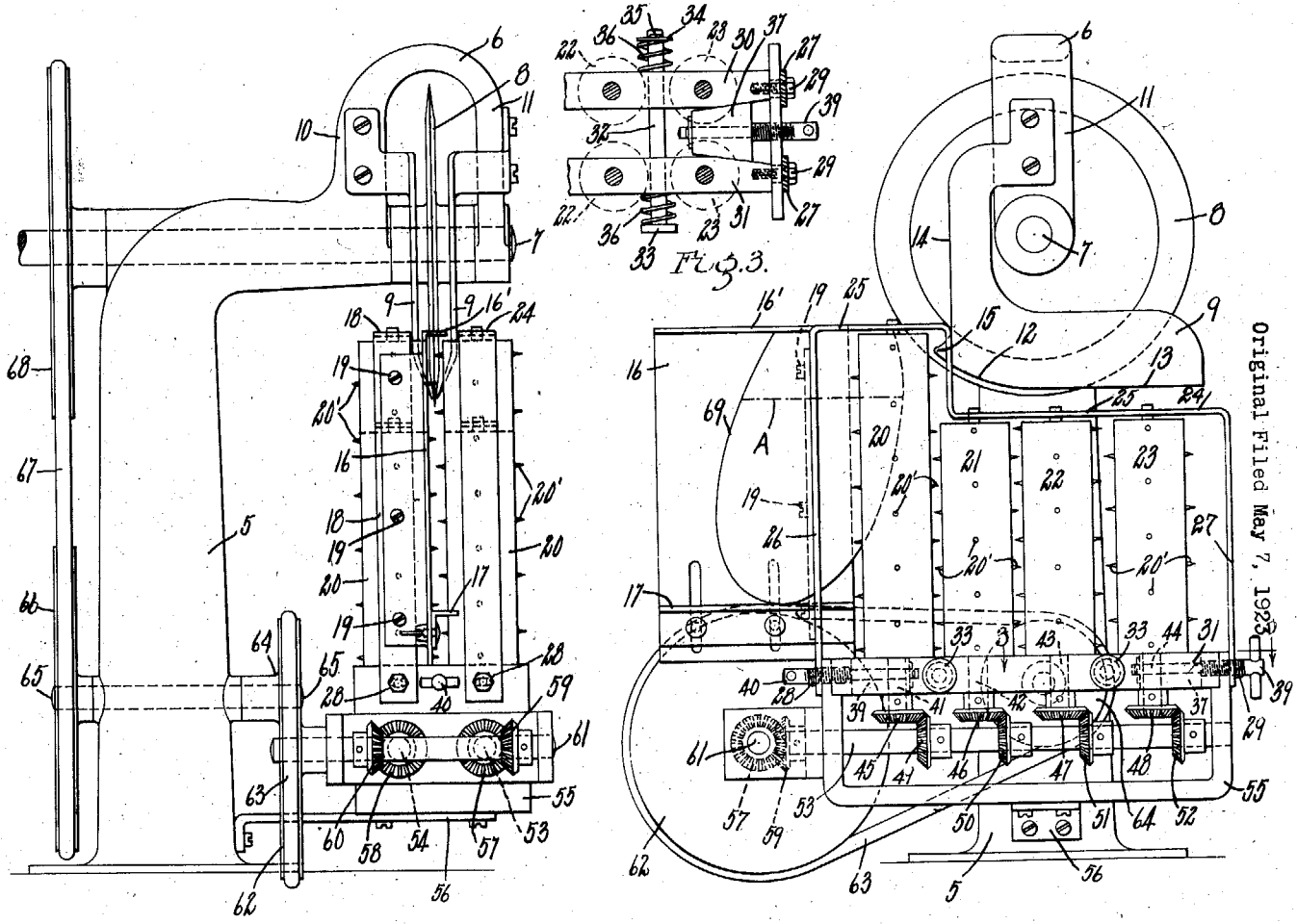
Figure 1 is a front elevation of a machine embodying my invention.
Fig. 2 is a side elevation of the same as viewed from the right of Fig. 1, illustrating a tap in position to be split.
Fig. 3 is a detail sectional plan taken on line 3—3 of Fig. 2, illustrating a portion of the means whereby the feed rolls are adjusted toward or away from each other.

In the drawings, 5 is the frame of the machine terminating at its upper end in a U-shaped head 6 upon which is rotatably mounted the main driving shaft 7 which is rotated by any suitable mechanism or power. A rotary cutter 8 is fastened to the shaft 7 and is rotated thereby. A pair of spreader plates 9 are provided adjacent to opposite faces respectively of the cutter 8 and are fastened at their upper ends to the two legs 10 and 11 of the head 6. These spreader plates terminate at their lower edges in a curved portion 12 concentric with the cutter 8 and a straight portion 13. The front edge 14 of each of the spreader plates has a projection 15 thereon which projects between the split portions of the tap in order to spread them apart after the tap has been split by the cutter 8.

The tap is guided to the cutter by a pair of guide plates 16 and 17. The guide plate 16 has a flange 16′ constituting an upper guiding edge and is fastened to a feed roller bearing frame 18 by screws 19, see Fig. 1, and the angle iron guide plate 17 is fastened to the guide plate 16.

The tap is fed to the cutter by a series of pairs of feed rolls 20, 21, 22 and 23, said rolls being provided with prongs 20′. One feed roll of each pair is rotatably mounted at its upper end upon the feed roller frame 18 and the other feed roll of each pair is rotatably mounted at its upper end upon a frame 24. The feed roll frames 18 and 24 are approximately alike, each consisting of a top plate 25 and end plates 26 and 27. The end plates 26 and 27 are fastened at their lower ends by screws 28 and 29 to crossheads 30 and 31. These crossheads are movably connected together by pins 32 which are each provided at their opposite ends respectively with a head 33 and a washer 34, the latter being held upon the pin 32 by a split pin 35.

Springs 36 are interposed between the head 33 and the crosshead 31 and between the washer 34 and the crosshead 30, these springs tending to press the crossheads 30 and 31 toward each other, while the same may be adjusted apart by means of wedges 37 and 38 which are mounted upon screws 39 and 40 having screw-threaded engagement with upstanding ends of a U-shaped frame 55. These ends of the frame 55 are interposed between the respective ends of the crossheads 30 and 31 and the ends 26 and 27 of the frames 18 and 24 and have slots (shown dotted in Figs. 1 and 3) through which extend the stems of the screws 28 and 29. When these screws are tightened the feed roll frames 18 and 24 and the crossheads 30 and 31 are secured to the frame 55, but upon the screws 28 and 29 being loosened the slots permit movement of the crossheads and feed roll frames, so that by rotating the screws 39 and 40 in the proper direction, the crossheads 30 and 31 and the roll frames 18 and 24 which are fastened thereto may be moved toward and away from each other, together with the pairs of rolls 20, 21, 22 and 23 which are rotatably mounted as hereinbefore set forth, at the upper ends upon the frames 18 and 24.

The feed rolls 20, 21, 22 and 23 are provided with shafts 41, 42, 43 and 44 respectively which extend downwardly therefrom and are rotatably mounted in the crossheads 30 and 31. These shafts are rotated by bevel gears 45, 46, 47 and 48 and which mesh into the bevel gears 49, 50, 51 and 52. The last-named gears are fastened to a pair of parallel shafts 53 and 54 rotatably mounted at their opposite ends in a U-shaped frame 55 which is fastened by a bracket 56 to the main frame 5.

The shafts 53 and 54 have bevel gears 57 and 58 fast thereto and meshing into gears 59 and 60 respectively which are fast to a shaft 61 rotatably mounted in a portion of the frame 55 and having a rotary motion imparted thereto by a pulley 62 which is driven by a belt 63 and pulley 64. The pulley 64 is fastened to a shaft 65 rotatably mounted in the frame 5 and having fastened at its opposite end a pulley 66 which is rotated by a belt 67 and by a pulley 68 which is fastened to the main shaft 7.

It will be noted that the upper ends of the feed rolls 20 extend toward the cutter 8 and beyond the upper ends of the feed rolls 21, 22 and 23 and that the cutting edge of the cutter 8 projects between the upper ends of the feed rolls 20, the object of this construction being that the upper end of the tap, or that end of the tap which is to be split by the cutter, shall be accurately positioned relatively to the cutting edge of the cutter shaft, so that when the cutting work commences and while the tap is being fed to the cutter by the rolls 20, it will split the tap on a predetermined plane between the lateral faces thereof, and having thus started the splitting of the tap in the proper plane, relatively to the lateral faces thereof, the spreader plates 9 and the rolls 21, 22 and 23 will continue to present and position the tap relatively to the cutter in the proper location. It will be understood that the prongs 20′ on the peripheries of the feed rolls serve the purpose of accurately and positively feeding the tap to the cutter.

The general operation of the mechanism hereinbefore specifically described is as follows:—A tap 69, Fig. 2 is placed against the inner face of the guide plate 16 with a straight rear edge of the tap bearing against the under side of the flange 16′ on the guide plate 16. The other end of the tap bears against the upper edge of the guide plate 17. The operator then pushes the tap forwardly between the pair of rolls 20, whereupon it is seized by the prongs 20′ on said rolls and fed forwardly into engagement with the cutter 8. The tap is fed by the rolls 20 between the pair of rolls 21 which seize the tap and feed it forward between the rolls 22, while the rolls 22 feed the tap forward between the rolls 23, and the rolls 23 feed the tap out of the machine.

While the tap is being fed, as hereinbefore described, the cutter splits the same from the rear end thereof downwardly to the broken line A and the projections 15 on the front edges of the spreader plates 9 enter between the split portions of the tap and further movement forward of the tap by the feed rolls causes the split portions to be spread apart by the spreader plates.

I claim:

1. A tap splitting machine having in combination, a rotary cutter, feeding means for feeding a tap edgewise past said cutter comprising a pair of feed rolls on the approach side of said cutter having ends overlying the cutting edge and adapted to control the portion of the tap being split while the cutter is operating thereon, and other feed rolls beyond the said pair in the direction of feed extending to close by the edge of the cutter in position to engage the unsplit portion of the tap as the tap moves past said cutter.

2. A tap splitting machine having, in combination, a rotary cutter, feeding means beside the cutter on opposite sides of the plane of the cutting edge arranged to control the tap while it is passing said cutter; said feeding means being in peripheral relation to the cutting edge with a portion of the feeding means controlling the portion of the tap being split while the cutter is operating thereon and with the remainder of the feeding means adapted to engage only the unsplit portion of the tap as the split portion thereof passes by the cutter.

3. A tap splitting machine having, in combination, a rotary cutter, a series of pairs of feed rolls adapted to feed a tap to said cutter and a pair of stationary spreader plates located upon opposite sides of said cutter and adapted to spread the portions of said tap which are split by said cutter away from each other.

4. A tap splitting machine having, in combination, a rotary cutter, the axis of which is horizontal, a series of pairs of vertical feed rolls adapted to feed a tap to said cutter and a pair of guide plates adapted to engage the opposite ends respectively of said tap and guide the same to the first of said pairs of feed rollers.

5. A tap splitting machine having, in combination, a rotary cutter, a series of pairs of feed rolls adapted to feed a tap to said cutter, the axes of said rolls lying in two parallel planes extending transversely of the axis of said cutter and located upon opposite sides respectively of said cutter, means to spread the split portions of said tap apart and means to adjust the rolls of said series of rolls toward and away from each other.

6. A tap splitting machine having, in combination, a rotary cutter, a series of pairs of feed rolls adapted to feed a tap to said cutter, the axes of said rolls lying in two parallel planes extending transversely of the axis of said cutter and located upon opposite sides respectively of said cutter, means to spread the split portions of said tap away from each other, a pair of frames in which one roll of each of said pairs of rolls respectively is rotatably mounted and means to adjust said frames and the rolls mounted thereon toward and away from each other.

7. A tap splitting machine having, in combination, a rotary cutter, a series of pairs of feed rolls adapted to feed a tap to said cutter, the axes of said rolls lying in two parallel planes extending transversely of the axis of said cutter and located upon opposite sides respectively of said cutter, means to spread the split portions of said tap away from each other, a pair of frames in which one roll of each of said pairs of rolls is rotatably mounted, a pair of conical adjusting members interposed between said frames, means to adjust said conical members toward each other whereby said frames may be moved apart and yielding means engaging said frames and adapted to move them toward each other whereby said frames and the feed rolls mounted thereon may be adjusted toward and away from each other.

8. A tap splitting machine having, in combination, a rotary cutter, a series of pairs of feed rolls adapted to feed a tap to said cutter and a pair of stationary spreader plates located on opposite sides respectively of said cutter and each provided with a projection on its front edge adjacent the bottom thereof adapted to project between the split portions of said tap and spread them away from each other.

9. A tap splitting machine having, in combination, a rotary cutter, a series of pairs of feed rolls adapted to feed a tap to said cutter, a pair of stationary spreader plates located on opposite sides respectively of said cutter and upon opposite sides respectively of a plane positioned between the rolls of each of said pairs of rolls, each spreader plate being provided with a projection on its front edge adjacent the bottom thereof adapted to project between the split portions of said tap and spread them away from each other, said spreader plates being located at the rear of the first pair of feed rolls, the lower edges of said spreader plates extending rearwardly from said first pair of feed rolls and above the other pairs of feed rolls.

10. A tap splitting machine having, in combination, a rotary cutter, means to feed a tap to said cutter, means to guide said tap relatively to said cutter in a plane approximately parallel to the face of said cutter and a spreader positioned adjacent to said cutter and adapted to project between the portions of said tap which are split by said cutter and spread said portions apart.

11. A tap splitting machine having, in combination, a rotary cutter, means to feed a tap to said cutter, means to guide said tap relatively to said cutter in a plane approximately parallel to the face of said cutter and a pair of stationary spreader plates located upon opposite sides of said cutter and adapted to spread the portions of said tap which are split by said cutter away from said other.

12. A tap splitting machine having, in combination, a rotary cutter, the axis of which is horizontal, a series of pairs of vertical feed rolls adapted to feed a tap to said cutter, and guide plates adapted to engage the opposite ends and one face of said tap and guide the same to the first of said pairs of feed rolls.

13. A tap-splitting machine having in combination, a rotary cutter, means to feed a tap edgewise past said cutter; a guide ahead of said feeding means adapted to be engaged by the edge of the tap to be split; the said guide and feeding means being arranged so that the portion of the tap to be split is presented to the feeding means on the approach side of the cutter in position for said feeding means to control the portion of tap being split while the cutter is operating thereon, and so that only the unsplit portion of the tap is engaged by the feeding means as the tap is fed past the cutter.

14. A tap-splitting machine having in combination, a rotary cutter, means to feed a tap edgewise past said cutter comprising tap-engaging surfaces on the approach side of the cutter overlying the cutting edge thereof and arranged to engage the portion of the tap being split; and other tap-engaging surfaces beyond the first said surfaces in the direction of feed, arranged to engage only the unsplit portion of the tap; and guiding means on the approach side of the first said surfaces, arranged with relation to said cutter to present the tap to the first said surfaces so that a predetermined portion of the tap will be split by said cutter.

15. A tap-splitting machine having, in combination, a rotary cutter, means to feed a tap edgewise past said cutter comprising moving tap-engaging surfaces arranged on opposite sides of the plane of the cutting edge, with the said surfaces on the approach side of the cutter overlying said cutting edge and with the remainder of said surfaces only extending up to the cutting edge; the said surfaces and cutter being so organized that the surfaces overlying the cutting edge engage and control the portion of the tap being split while the cutter is operating thereon and the remainder of said surfaces engage only the unsplit portion of the tap while the split portion of the tap continues past the cutter.

16. A tap-splitting machine having in combination, a rotary cutter, and means for feeding a tap past said cutter comprising tap-engaging surfaces overlying the cutting edge on opposite sides thereof for engaging the portion of the tap being split, and other tap engaging surfaces in alignment with the first said surfaces for engaging the unsplit portion of the tap whereby the split portion is fed past the cutter with the split in the plane of the cutting edge.

Signed at Boston, Massachusetts, this 30th day of June, 1928.

WALTER J. RANCOURT.